United States Patent [19]

Naaktgeboren

[11] Patent Number: 4,489,648
[45] Date of Patent: Dec. 25, 1984

[54] BALER DENSITY CONTROL MECHANISM

[75] Inventor: Adrianus Naaktgeboren, Veldegem, Belgium

[73] Assignee: Sperry Corporation, New Holland, Pa.

[21] Appl. No.: 571,772

[22] Filed: Jan. 18, 1984

[51] Int. Cl.³ .................................. B30B 9/30
[52] U.S. Cl. .................................. 100/191
[58] Field of Search .............. 100/43, 191, 192, 188, 100/189, 147, 148; 56/341, 342, 343

[56] References Cited

U.S. PATENT DOCUMENTS

| | | | |
|---|---|---|---|
| 802,410 | 10/1905 | Sanders | 100/191 X |
| 1,333,068 | 3/1920 | Evans et al. | 100/191 |
| 1,631,881 | 6/1927 | Murray | 100/191 |
| 3,024,719 | 3/1962 | Englund | 100/192 X |
| 3,350,999 | 11/1967 | Morse | 100/43 |
| 4,037,528 | 7/1977 | White | 100/191 |
| 4,125,071 | 11/1978 | Young | 100/191 |

Primary Examiner—Billy J. Wilhite
Attorney, Agent, or Firm—Darrell F. Marquette; Frank A. Seemar; Larry W. Miller

[57] ABSTRACT

A mechanism is provided in a baler for changing the positions of the side rails and the top rail of a bale case to adjust bale density. The mechanism includes side members pivotally connected to the side rails and a top member secured to the top rail. Lever members are pivotally connected to the side members and also engage the top member. A hydraulic cylinder unit is connected between the lever members to move the lever members toward each other. This causes the side members to be pivoted toward each other thereby moving the side rails toward each other to reduce the width of the baling chamber. The movement of the lever members toward each other also causes the top member to be moved downward thereby moving the top rail downward to reduce the height of the baling chamber.

9 Claims, 2 Drawing Figures

BALER DENSITY CONTROL MECHANISM

BACKGROUND OF THE INVENTION

This invention relates generally to agricultural balers and, in particular, to density control mechanisms for such balers.

In the baler art, it is known that bale density may be controlled by changing the position of one or more of the rails of the base case thereby changing the dimensions, i.e., height and width, of the bale chamber. Various types of mechanisms have been provided for performing this function. U.S. Pat. No. 4,125,071 discloses one such type of mechanism that includes an upper channel member disposed above the top rail of the bale case and a lower channel member disposed below the bottom rail of the bale case. These upper and lower channel members are connected by rods having integrally formed crank handles at their upper ends. When the crank handles are turned in one direction, the upper channel member pushes the top rail of the bale case downwardly toward the bottom rail thereof to reduce the height of the baling chamber.

U.S. Pat. No. 4,037,528 discloses another such type of mechanism that includes hydraulic cylinder devices connected at their ends to upper and lower bell cranks which carry rollers contacting the side rails of the bale case. The upper bell cranks are interconnected by a cross beam member attached to the top rail of the bale case. The lower bell cranks are mounted on lugs connected to the bottom rail of the bale case. When the hydraulic cylinder devices are contracted, the upper and lower bell cranks are pivoted in a manner to move the side rails of the bale case toward each other to reduce the width of the baling chamber. The pivoting movement of the upper bell cranks also simultaneously causes the top rail of the bale case to be moved downwardly toward the bottom rail thereof to reduce the height of the baling chamber.

SUMMARY OF THE INVENTION

The present invention provides control means for changing the positions of the top and side rails of the bale case of a baler. The control means includes a bottom member located adjacent the bottom rail of the bale case, side members pivotally connected at their lower ends of the bottom member and also pivotally connected intermediate their ends to the side rails, and a top member located adjacent and connected to the top rail. Lever members are pivotally connected to the upper ends of the side members, and the lever members engage the top member. Power means are connected between the lever members to move the lever members toward each other. This causes the side members to be pivoted toward each other thereby moving the side rails of the bale case toward each other to vary the width of the baling chamber. The above-mentioned movement of the lever members toward each other also causes the top member to be moved toward the bottom member thereby moving the top rail of the bale case toward the bottom rail thereof to vary the height of the baling chamber.

DESCRIPTION OF THE PREFERRED EMBODIMENT

Figure 1:
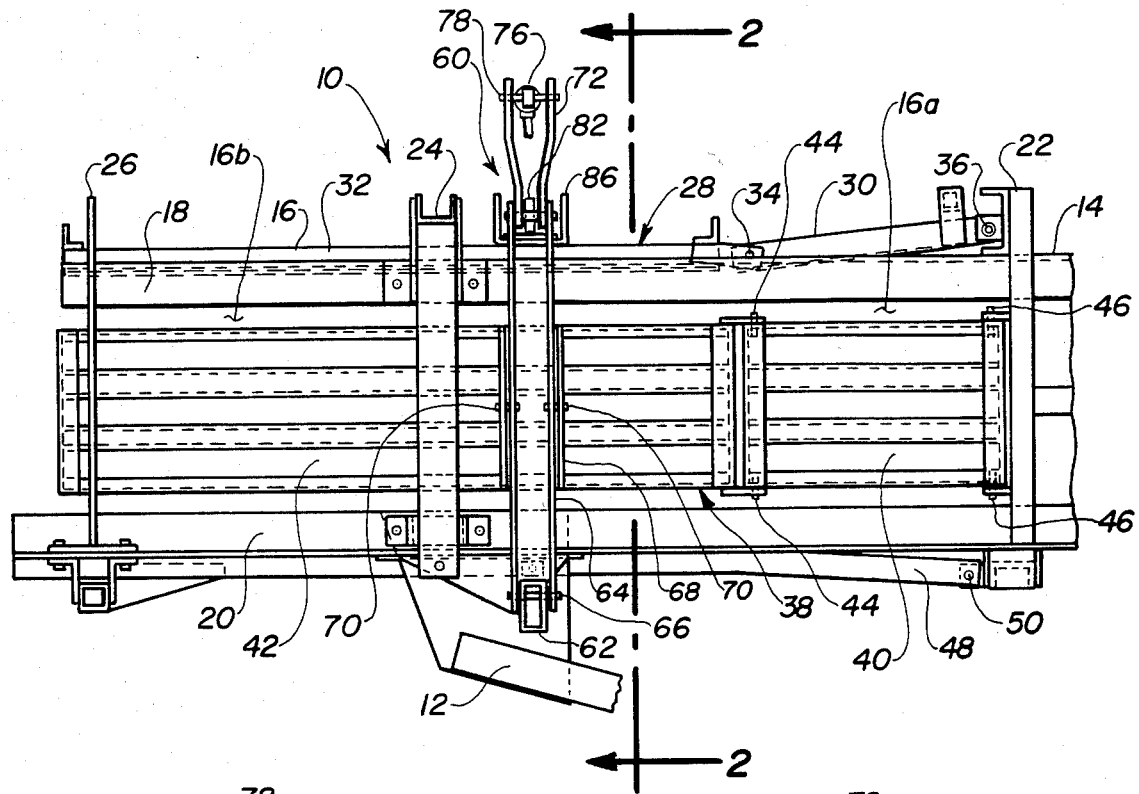
FIG. 1 is a side elevational view of a bale case embodying the preferred embodiment of the control mechanism of the present invention.

Referring to FIG. 1, a bale case 10 of an agricultural baler is supported on a frame 12. The bale case 10 includes a forward portion 14 (only a small part of which is shown) and a rearward portion 16. A plunger (not shown) is reciprocably disposed in the forward portion 14 of the bale case 10 to form crop material into rectangular bales. These rectangular bales are pushed through the rearward portion 16 of the bale case 10 where they are bound in a conventional manner with suitable material such as twine before being discharged from the baler.

The bale case rearward portion 16 includes upper corner rails 18 and lower corner rails 20. See also FIG. 2. These upper and lower corner rails 18,20 are held stationary by collar-like frames 22,24,26 which extend around the outside of the bale case rearward portion 16 and are rigidly connected, such as by bolts or welding, to the corner rails 18,20. The bale case rearward portion 16 also includes a top center rail 28 comprised of a first section 30 and a second section 32 pivotally connected together at 34. The first section 30 of the top center rail 28 is also pivotally connected at 36 to the frame 22. This type of top center rail is also disclosed in U.S. Pat. No. 4,125,071. The bale case rearward portion 16 further includes identical, opposite side rails 38 each formed of a first section 40 and a second section 42 pivotally connected together by pins 44. The first section 40 of each side rail 38 is also pivotally connected to the frame 22 by pins 46. The bale case rearward portion 16 also has a bottom rail 48 fixed at 50 to the frame 22.

Figure 2:
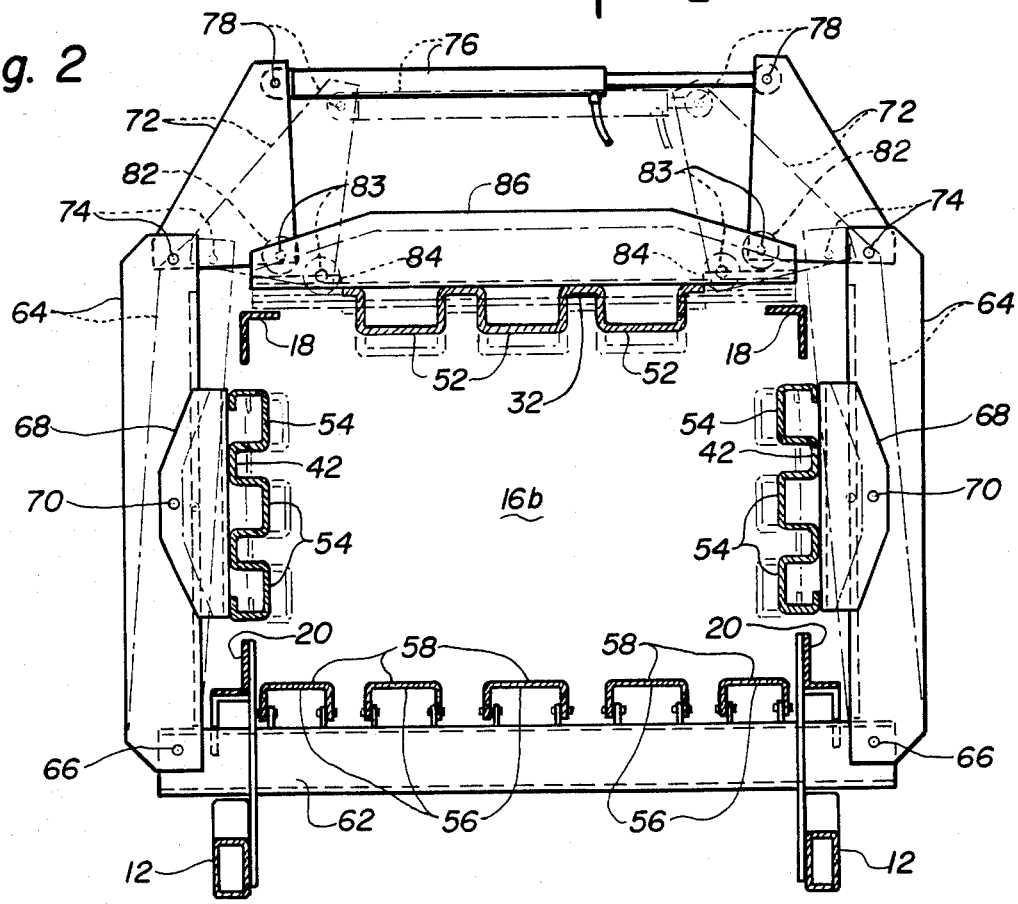
FIG. 2 is an enlarged sectional view taken along lines 2-2 in FIG. 1 showing one position of the control mechanism in full lines and another position of the control mechanism in phantom.

The first and second sections 30,32 of the top rail 28 and the first and second sections 40,42 of the side rails 38 are each preferably formed of a piece of sheet metal folded into a corrugated pattern as best seen in cross-section in FIG. 2. The top rail first and second sections 30,32 have relatively flat surfaces 52 which engage the top of a bale moving through the bale case 10. The side rail first and second sections 40,42 have relatively flat surfaces 54 which engage the sides of a bale moving through the bale case 10. The bottom rail 48 includes a series of inverted generally U-shaped channel members 56 arranged side-by-side. The bottom rail members 56 have relatively flat surfaces 58 on which a bale rests while moving through the bale case 10.

The top rail first section 30 and the underlying portion of the bottom rail 48 are inclined relative to each other so that the vertical distance between their opposed surfaces 52 and 58 gradually decreases from right to left in FIG. 1. This type of arrangement between the top and bottom rails of a bale case is also disclosed in U.S. Pat. No. 4,125,071. The side rail first sections 40 are inclined relative to each other so that the horizontal distance between their opposed surfaces 54 gradually decreases from right to left in FIG. 1. The top rail second section 32 and the underlying portion of the bottom rail 48 will be maintained substantially parallel to each other so that the vertical distance between their opposed surfaces 52 and 58 is substantially constant from right to left in FIG. 1. The side rail second sections 42 will be maintained substantially parallel to each other so that the horizontal distance between their opposed surfaces 54 is substantially constant from right to left in FIG. 1.

With the top rail 28, the side rails 38, and the bottom rail 48 formed and arranged as described above, the bale case rearward portion 16 has a chamber area 16a of a gradually tapering height and width and a chamber area 16b of substantially uniform height and width. As is well known in the baler art, this causes bales to be formed which are of satisfactory density but with no distortion in shape.

According to the present invention, a control mechanism 60 is provided for changing the positions of the first and second sections 30,32 of the top rail 28 and for changing the positions of the first and second sections 40,42 of the side rails 38 to adjust the dimensions of the chamber areas 16a and 16b of the bale case rearward portion 16 to thereby adjust bale density. The control mechanism 60 includes a bottom member 62 which forms part of the frame 12 extending transversely of the bale case rearward portion 16 and located underneath the bottom rail 48, and side members 64 pivoted at their lower ends by pins 66 to the outer ends of the bottom member 62. Brackets 68, pivoted by pins 70 to the side members 64, are rigidly attached to the side rail second sections 42. Lever members 72 are pivoted by pins 74 to the upper ends of the side members 64. The side members 64, brackets 68 and pins 70 also provide the main support for the side rail first and second sections 40,42. Power means such as a hydraulic cylinder unit 76, of the contracting type, is pivotally connected at its ends by pins 78 to the lever members 72. The lever members 72 carry rollers 82 on pins 83 which engage portions 84 of a top member 86 that is located above and secured to the top rail second section 32. The top member 86 also supports the top rail first and second sections 30,32. The bottom member 62 is preferably of generally rectangular cross-section while the side members 64 and the top member 86 are preferably of generally U-shaped cross-section.

The control mechanism 60 is operated by contracting the hydraulic cylinder unit 76. When the hydraulic cylinder unit 76 is contracted from the full line position to the phantom position shown in FIG. 2, the lever members 72 are moved toward each other and pivoted inwardly on the pins 74 causing the side members 64 to be pivoted inwardly on the pins 66, and also simultaneously causing the top member 86 to be pushed downwardly by the rollers 82. This causes the side rail second sections 42 to be moved inwardly toward each other to reduce the horizontal distance between their opposed surfaces 54. The side rail second sections 42 remain parallel to each other due to the fact that the side members 64 are pivoted by the pins 70 to the brackets 68. The inward movement of the side rail second sections 42 causes the side rail first sections 40 to be pivoted via the pins 44 and 46 to a position where they become inclined at a greater angle with respect to each other. The side rail first sections 40 are then positioned so that the horizontal distance between their opposed surfaces 54 decreases at a faster rate from right to left in FIG. 1. Simultaneous with the inward movement of the side rail second sections 42, the top rail second section 32 is moved downwardly toward the bottom rail 48 to reduce the vertical distance between their opposed surfaces 52 and 58. The top rail second section 32 remains parallel to the underlying portion of the bottom rail 48. The downward movement of the top rail second section 32 causes the top rail first section 30 to be pivoted via the pins 34 and 36 to a position where it becomes inclined at a greater angle with respect to the bottom rail 48. The top rail first section 30 is then positioned relative to the bottom rail 48 so that the vertical distance between their opposed surfaces 52 and 58 decreases at a faster rate from right to left in FIG. 1.

It will be understood from the foregoing description that the control mechanism 60 is utilizied to change the height and width of the bale case chamber area 16a and 16b in order to adjust bale density. By contracting the hydraulic cylinder unit 76, the bale case chamber areas 16a and 16b are generally reduced in height and width thereby usually resulting in higher bale density. Conversely, by extending the hydraulic cylinder unit 76, the bale case chamber areas 16a and 16b are generally enlarged in height and width thereby usually resulting in lower bale density.

The lever members 72 are each constructed so that the distance between the pins 74 and 83 divided by the distance between the pins 78 and 83 is equal to the combined area of the surfaces 54 of one side rail second section 42 divided by the combined area of the surfaces 52 of the top rail second section 32. With the lever members 72 constructed in this manner, the side rail second sections 42 and the top rail second section 32 apply equal surface pressure on all sides of a bale which results in uniform bale density.

The control mechanism 60 is positioned at a location along the length of the bale case rearward portion 16 as shown in FIG. 1 which causes the top rail second section 32 to remain parallel to the underlying portion of the bottom rail 48 and which also causes the side rail second sections 42 to remain parallel to each other.

The following claims are intended to cover all modifications and variations of the preferred embodiment of the present invention without departing from the spirit and scope of the invention.

Having thus described the invention, what is claimed is:

1. In a baler having a bale case with a top rail, a pair of side rails, and a bottom rail, control means for changing the positions of said top rail and said side rails, said control means comprising:
   (a) a bottom member located adjacent said bottom rail;
   (b) side members pivotally connected at their lower ends to said bottom member and pivotally connected intermediate their upper and lower ends to said side rails;
   (c) a top member located adjacent and connected to said top rail;
   (d) lever members pivotally connected to the upper ends of said side members and engaging said top member; and
   (e) power means connected between said lever members to move said lever members toward each other thereby causing said side members to be pivoted toward each other and also simultaneously causing said top member to be moved toward said bottom member.

2. The control means of claim 1, wherein said power means comprises a hydraulic cylinder unit connected at its ends to said lever members.

3. The control means of claim 1, wherein said lever members carry rollers for contacting said top member.

4. The control means of claim 1, wherein said bottom member is located underneath said bottom rail, and said side members are pivotally connected to the outer ends of said bottom member.

5. The control means of claim 1, wherein said side members support said side rails, and said top member supports said top rail.

6. The control means of claim 1, wherein said top rail comprises first and second top rail sections pivotally connected together, and said side rails each comprise first and second side rail sections pivotally connected together.

7. The control means of claim 6, wherein said top rail first section is inclined relative to said bottom rail, and said top rail second section is maintained substantially parallel to an underlying portion of said bottom rail.

8. The control means of claim 7, wherein said side rail first sections are inclined relative to each other, and said side rail second sections are maintained substantially parallel to each other.

9. The control means of claim 8, wherein said side members are pivotally connected to said side rail second sections, and said top member is connected to said top rail second section.

* * * * *